Patented Feb. 18, 1936

2,031,200

UNITED STATES PATENT OFFICE 2,031,200

PROCESS OF MAKING PRODUCTS INCLUDING ALIPHATIC ALDEHYDES

Karl Baur, Ludwigshafen-on-the-Rhine, Germany, assignor, by mesne assignments, to Union Carbide and Carbon Corporation, a corporation of New York No Drawing. Application January 30, 1930, Serial No. 424,720. In Germany February 5, 1929

16 Claims. (Cl. 260—138)

The present invention relates to improvements in converting 1,2 alkylene oxides into isomeric products including aldehydes.

It is already known that the reactive 1,2-alkylene-oxides, such as ethylene oxide, 1,2-propylene oxide, and 1,2-butylene oxide may, generally speaking, be readily converted into isomers including aliphatic aldehydes and that the carrying out of the reaction at elevated temperatures in the gas phase is greatly facilitated by the presence of catalysts. The chlorides of zinc and of lead as well as calcined aluminium oxide, and also metallic catalysts, for example copper and nickel, have already been proposed as the catalysts. The conversion of 1,2-alkylene-oxides into aldehydes cannot be carried out on an industrial scale with the said catalysts, however, without some further treatment, because the catalysts either lead to small yields, or they possess an unsatisfactory working life in consequence of pollution or carbonization.

I have now found that these objections are obviated to a very great extent when the elements of the 5th to 6th groups of the periodic system in the form of the compounds containing the radicles of their acids containing oxygen, such as the acids themselves, or the anhydrides or salts of these acids, for example of metals or preferably of alkaline earth metals or of earth metals, such as calcium, strontium, barium, magnesium or cerium, which are stable to decomposition as well as to volatilization under the conditions of working, are employed as the catalysts either alone or in admixture with each other or with oxidic metal compounds, that is oxides, hydroxides or carbonates, which latter may decompose into oxides and are therefore considered as equivalents of the oxides and included within the term oxidic compounds. The said oxidic compounds may be chosen for example from those of any heavy metals, such as copper or silver, of alkaline earth metals or of earth metals, such as calcium, strontium, barium, magnesium or cerium. Phosphates, for example ortho-, pyro- or meta phosphates, or sulphates, for example, may be mentioned. The process described above allows apparently of converting not only 1,2-alkylene oxides, but also 2,3-alkylene oxides in which vicinal carbon atoms which are not the final members of a chain are connected with the oxygen atom forming the oxide group.

The catalysts may be employed alone as such, or on carriers, or in intimate admixture with inert materials such as pumice meal, clay, kieselguhr, glass powder, graphite meal and the like. Where the catalysts contain additions of oxides, hydroxides or carbonates as described above they may be subjected to a reduction with hydrogen at elevated temperatures before being used. Generally speaking the reaction is carried out at atmospheric or reduced pressures, but it may also be carried out under moderately increased pressure. It is preferable to employ reaction temperatures of between 150° and 450° centigrade, temperatures between 200° and 400° centigrade being usually employed. The vaporized 1,2-alkylene oxides may be led over the catalysts by themselves, and in some cases it is advantageous to mix inert gases, such as nitrogen or carbon dioxide or water vapor, with the alkylene oxide vapors.

In addition to aldehydes, other valuable isomeric products, especially ketones and unsaturated alcohols, are obtained in the practice of this process. The proportion of isomers other than aldehydes in the resulting products may be increased, if so desired, by varying the catalysts and the other conditions of the reaction.

The following examples will further illustrate how the said invention may be carried out in practice, but the invention is not restricted to these examples. The parts are by weight.

*Example 1*

Precipitated magnesium ammonium phosphate is heated strongly until ammonia and water are no longer involved. The finely divided magnesium pyrophosphate thus obtained is mixed with an equal weight of kieselguhr, made into a paste with water and molded. After drying and heating the molded masses, vapors of 1,2-propylene oxide are led over them with a velocity of 100 grams per hour per litre of the catalyst at about 260° centigrade. Propionaldehyde is recovered from the condensate in good yields, in addition to allyl alcohol and a little acetone.

*Example 2*

Cerous sulphate, after having been heated to 300° centigrade, is made into a paste with a 10 per cent solution of barium hydroxide, molded and dried. 1,2-propylene oxide vapors are passed over this catalyst at 230° centigrade, whereby propionaldehyde is obtained in a good yield. Instead of cerous sulphate, magnesium pyrophosphate may be employed.

*Example 3*

Cerous sulphate, after having been heated to 300° centigrade, is made into a paste with a 10 per cent solution of barium hydroxide, molded and dried. Vapors of a commercial butylene oxide, which consists of about 50 per cent of 1,2-isobutylene oxide, 20 per cent of 1,2-n-butylene oxide and 30 per cent of 2,3-n-butylene oxide, are then passed over this catalyst with a velocity of 90 grams per hour per litre of the catalyst at 250° centigrade. The condensate contains over 50 per cent of isobutyraldehyde and n-butyraldehyde in addition to methyl ethyl ketone and butenols.

*Example 4*

Vapors of a commercial butylene oxide, the main portion of which is 1,2-butylene oxide, are passed over the catalytic mass described in Example 2 at 250° centigrade and at a velocity of 90 grams per hour per litre of the catalytic substance. The condensate obtained contains more than 50 per cent of n-butyraldehyde and a considerable quantity of methyl ethyl ketone, together with small quantities of butenols.

*Example 5*

1 part of copper carbonate is mixed with 4 parts of magnesium ammonium phosphate and the mixture is heated to about 350° centigrade until the evolution of ammonia has ceased. The mass is then ground and passed through a sieve with 6400 meshes per square centimetre. The powder is then made into a paste with water and molded, the molded pieces are dried and then heated slowly to from 180° to 200° centigrade in a current of hydrogen. Thereafter vapors of ethylene oxide are passed at from 180° to 200° centigrade over the catalytic mass, whereby 75 per cent of the oxide is converted into acetaldehyde.

What I claim is:—

1. Process for converting 1,2 alkylene oxides containing from 2 to 4 carbon atoms into products including aldehydes which comprises passing vapors of the oxides at a temperature between about 150° and 450° C. over a catalytic substance comprising essentially a stable metal compound which is not volatile at the working temperatures and which contains a radicle of an oxygen-containing acid of those normally solid elements of the 5th and 6th groups of the periodic system which are capable of forming oxygen acids.

2. Process for converting 1,2 alkylene oxides containing from 2 to 4 carbon atoms into products including aldehydes which comprises passing vapors of the oxides at a temperature between about 150° and 450° C. over a catalytic substance comprising essentially a stable salt which is not volatile at the working temperatures and which contains a radicle of an oxygen-containing acid of those normally solid elements of the 5th and 6th groups of the periodic system which are capable of forming oxygen acids.

3. Process for converting 1,2 alkylene oxides containing from 2 to 4 carbon atoms into products including aldehydes which comprises passing vapors of the oxides at a temperature between about 150° and 450° C. over a catalytic substance which is not volatile at the working temperature and which essentially comprises one of the group consisting of stable metal sulphates and phosphates.

4. Process for converting 1,2 alkylene oxides containing from 2 to 4 carbon atoms into products including aldehydes which comprises passing vapors of the oxides at a temperature between about 150° and 450° C. over a catalytic substance which is not volatile at the working temperature and which essentially comprises one of the group consisting of stable alkaline earth metal sulphates and phosphates.

5. Process for converting 1,2 alkylene oxides containing from 2 to 4 carbon atoms into products including aldehydes which comprises passing vapors of the oxides at a temperature between about 150° and 450° C. over a catalytic substance which is not volatile at the working temperature and which essentially comprises a calcium phosphate.

6. Process for converting 1,2 alkylene oxides containing from 2 to 4 carbon atoms into products including aldehydes which comprises passing vapors of the oxides at a temperature between about 150° and 450° C. over a catalytic substance comprising essentially a stable metal compound which is not volatile at the working temperatures and which contains a radicle of an oxygen-containing acid of those normally solid elements of the 5th and 6th groups of the periodic system which are capable of forming oxygen acids and also an oxidic compound of a heavy metal selected from the group consisting of silver and copper.

7. Process for converting 1,2 alkylene oxides containing from 2 to 4 carbon atoms into products including aldehydes which comprises passing vapors of the oxides at a temperature between about 150° and 450° C. over a catalytic substance comprising essentially a stable metal pyrophosphate which is not volatile at the working temperatures and also an oxidic compound of a heavy metal selected from the group consisting of silver and copper.

8. Process for converting 1,2 alkylene oxides containing from 2 to 4 carbon atoms into products including aldehydes which comprises passing vapors of the oxides at a temperature between about 150° and 450° C. over a catalytic substance comprising essentially a stable metal phosphate which is not volatile at the working temperatures and also an oxidic compound of copper which catalytic substance has been previously subjected to a reducing treatment with hydrogen while heating to temperatures of at least about 180° C.

9. Process for converting propylene oxide into products including propionaldehyde which comprises passing vapors of propylene oxide at a temperature between about 150° and 450° C. over a catalytic substance comprising essentially magnesium pyrophosphate.

10. Process for converting propylene oxide into products including propionaldehyde which comprises passing vapors of propylene oxide at a temperature between about 150° and 450° C. over a catalytic substance comprising essentially magnesium pyrophosphate and also an oxidic compound of copper which catalytic substance has been previously subjected to a reducing treatment with hydrogen while heating to temperatures of at least about 180° C.

11. Process for converting 1,2 alkylene oxides containing from 2 to 4 carbon atoms into products including aldehydes which comprises passing vapors of the oxides at a temperature between about 150° and 450° C. over a catalytic substance comprising essentially a stable compound which is not volatile at the working temperatures and which contains a radicle of an oxygen-containing acid of those normally solid elements of the 5th and 6th groups of the periodic system which are capable of forming oxygen acids, and also an oxidic compound of silicon stable at the working temperatures and selected from the group consisting of silicic acid and silicates.

12. Process for converting 1,2 alkylene oxides containing from 2 to 4 carbon atoms into products including aldehydes which comprises passing vapors of the oxides at a temperature between about 150° and 450° C. over a catalytic substance comprising essentially a stable metal phosphate which is not volatile at the working temperatures and also an oxidic compound of silicon, stable at the working temperatures and selected from the group consisting of silicic acid and silicates.

13. Process for converting 1,2 alkylene oxides containing from 2 to 4 carbon atoms into products including aldehydes which comprises passing vapors of the oxides at a temperature between about 150° and 450° C. over a catalytic substance comprising essentially a stable metal pyrophosphate which is not volatile at the working temperatures and also an oxidic compound of silicon, stable at the working temperatures and selected from the group consisting of silicic acid and silicates.

14. Process for converting 1,2 alkylene oxides containing from 2 to 4 carbon atoms into products including aldehydes which comprises passing vapors of the oxides at temperatures between about 150° and 450° C. over a catalytic substance comprising essentially magnesium pyrophosphate and also an oxidic compound of silicon, stable at the working temperatures and selected from the group consisting of silicic acid and silicates.

15. Process for converting 1,2 propylene oxide into products including propionaldehyde which comprises passing vapors of the oxide at a temperature between about 150° and 450° C. over a catalytic substance comprising essentially magnesium pyrophosphate and kieselguhr.

16. Process for converting 1,2 propylene oxide into products including propionaldehyde which comprises passing vapors of the oxide at about 260° C. over a catalytic substance comprising magnesium pyrophosphate and about an equal weight of kieselguhr.

KARL BAUR.

CERTIFICATE OF CORRECTION.

Patent No. 2,031,200.  February 18, 1936.

KARL BAUR.

It is hereby certified that error appears in the printed specification of the above numbered patent requiring correction as follows: Page 1, first column, lines 4-5 and 15, for "1,2-alkylene-oxides" read 1,2 alkylene oxides; same page, line 6, after "oxide" second occurrence, insert a comma; line 47, for "1,2-al-" read 1,2 al-; line 48, for "2,3-alkylene" read 2,3 alkylene; same page, second column, line 11, for "1,2-al-" read 1,2 al-; line 32, for "involved" read evolved; and line 48, for "centrigrade" read centigrade; page 2, first column, line 31, for "molded, the" read molded. The; and that the said Letters Patent should be read with these corrections therein that the same may conform to the record of the case in the Patent Office.

Signed and sealed this 7th day of April, A. D. 1936.

Leslie Frazer
Acting Commissioner of Patents.

(Seal)